(12) United States Patent
Suleman et al.

(10) Patent No.: US 11,171,992 B2
(45) Date of Patent: Nov. 9, 2021

(54) SYSTEM RESOURCE MANAGEMENT IN SELF-HEALING NETWORKS

(71) Applicant: Cisco Technology, Inc., San Jose, CA (US)

(72) Inventors: Azeem M. Suleman, San Jose, CA (US); Rajagopalan Janakiraman, Cupertino, CA (US); Pramila Deshraj Singh, Fremont, CA (US); Sree Balaji Varadharajan, San Jose, CA (US); Javed Asghar, Dublin, CA (US); Sachin Gupta, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 282 days.

(21) Appl. No.: 16/525,362

(22) Filed: Jul. 29, 2019

(65) Prior Publication Data

US 2021/0037057 A1 Feb. 4, 2021

(51) Int. Cl.
*H04L 29/06* (2006.01)
*H04L 12/46* (2006.01)

(52) U.S. Cl.
CPC .......... *H04L 63/20* (2013.01); *H04L 12/4633* (2013.01); *H04L 12/4641* (2013.01)

(58) Field of Classification Search
None
See application file for complete search history.

(56) References Cited

U.S. PATENT DOCUMENTS

| | | | |
|---|---|---|---|
| 8,743,700 | B2 | 6/2014 | Heinz et al. |
| 9,319,300 | B2 | 4/2016 | Huynh Van et al. |
| 9,485,143 | B1 | 11/2016 | Vachharajani et al. |
| 10,165,487 | B2 | 12/2018 | Chowdhury |

(Continued)

FOREIGN PATENT DOCUMENTS

| | | |
|---|---|---|
| CA | 2656409 A1 | 1/2008 |
| CA | 2656412 A1 | 3/2008 |

(Continued)

OTHER PUBLICATIONS

PCT Notification of Transmittal of the International Search Report and the Written Opinion of the International Searching Authority, or the Declaration for Application No. PCT/US2020/043875 dated Nov. 30, 2020.

*Primary Examiner* — Cai Y Chen
(74) *Attorney, Agent, or Firm* — Patterson + Shendan, LLP

(57) ABSTRACT

The present disclosure provides for system resource management in self-healing networks by grouping End Point Groups (EPGs) into a plurality of policy groups based on shared security policies; identifying a first policy group with a highest resource demand; assigning a first security policy corresponding to the first policy group to a first switch of a plurality of switches; identifying a second plurality of EPGs from the remaining EPGs that were not included in the first policy group; grouping the second plurality of EPGs into a second plurality of policy groups based on shared security policies; identifying a second policy group with a highest resource demand of the second plurality of policy groups;

(Continued)

and assigning a second security policy corresponding to the second policy group to a second switch of the plurality of switches.

20 Claims, 7 Drawing Sheets

(56) References Cited

U.S. PATENT DOCUMENTS

| | | | |
|---|---|---|---|
| 2007/0248091 A1* | 10/2007 | Khalid | H04L 63/0272 370/392 |
| 2008/0002576 A1 | 1/2008 | Bugenhagen et al. | |
| 2008/0002670 A1 | 1/2008 | Bugenhagen et al. | |
| 2008/0002676 A1 | 1/2008 | Wiley et al. | |
| 2008/0002677 A1 | 1/2008 | Bugenhagen et al. | |
| 2008/0002711 A1 | 1/2008 | Bugenhagen | |
| 2008/0002716 A1 | 1/2008 | Wiley et al. | |
| 2008/0005156 A1 | 1/2008 | Edwards et al. | |
| 2008/0049615 A1 | 2/2008 | Bugenhagen | |
| 2008/0049624 A1 | 2/2008 | Ray et al. | |
| 2008/0049625 A1 | 2/2008 | Edwards et al. | |
| 2008/0049626 A1 | 2/2008 | Bugenhagen et al. | |
| 2008/0049628 A1 | 2/2008 | Bugenhagen | |
| 2008/0049629 A1 | 2/2008 | Morrill | |
| 2008/0049630 A1 | 2/2008 | Kozisek et al. | |
| 2008/0049631 A1 | 2/2008 | Morrill | |
| 2008/0049632 A1 | 2/2008 | Ray et al. | |
| 2008/0049637 A1 | 2/2008 | Morrill et al. | |
| 2008/0049638 A1 | 2/2008 | Ray et al. | |
| 2008/0049639 A1 | 2/2008 | Wiley et al. | |
| 2008/0049640 A1 | 2/2008 | Heinz et al. | |
| 2008/0049641 A1 | 2/2008 | Edwards et al. | |
| 2008/0049649 A1 | 2/2008 | Kozisek et al. | |
| 2008/0049650 A1 | 2/2008 | Coppage et al. | |
| 2008/0049745 A1 | 2/2008 | Edwards et al. | |
| 2008/0049746 A1 | 2/2008 | Morrill et al. | |
| 2008/0049747 A1 | 2/2008 | McNaughton et al. | |
| 2008/0049748 A1 | 2/2008 | Bugenhagen et al. | |
| 2008/0049753 A1 | 2/2008 | Heinze et al. | |
| 2008/0049757 A1 | 2/2008 | Bugenhagen | |
| 2008/0049769 A1 | 2/2008 | Bugenhagen | |
| 2008/0049775 A1 | 2/2008 | Morrill et al. | |
| 2008/0049776 A1 | 2/2008 | Wiley et al. | |
| 2008/0049777 A1 | 2/2008 | Morrill et al. | |
| 2008/0049787 A1 | 2/2008 | McNaughton et al. | |
| 2008/0049927 A1 | 2/2008 | Wiley et al. | |
| 2008/0052206 A1 | 2/2008 | Edwards et al. | |
| 2008/0052387 A1 | 2/2008 | Heinz et al. | |
| 2008/0052393 A1 | 2/2008 | McNaughton et al. | |
| 2008/0052394 A1 | 2/2008 | Bugenhagen et al. | |
| 2008/0052401 A1 | 2/2008 | Bugenhagen et al. | |
| 2008/0052628 A1 | 2/2008 | Bugenhagen et al. | |
| 2008/0052784 A1 | 2/2008 | Wiley et al. | |
| 2008/0095049 A1 | 4/2008 | Bugenhagen et al. | |
| 2008/0095173 A1 | 4/2008 | Bugenhagen | |
| 2008/0167846 A1 | 7/2008 | Bugenhagen | |
| 2008/0279183 A1 | 11/2008 | Wiley et al. | |
| 2009/0016361 A1* | 1/2009 | Serbest | H04L 12/4633 370/399 |
| 2009/0225655 A1 | 9/2009 | Ray et al. | |
| 2009/0238071 A1 | 9/2009 | Ray et al. | |
| 2009/0300153 A1 | 12/2009 | Ray et al. | |
| 2010/0085887 A1 | 4/2010 | Ray et al. | |
| 2010/0208611 A1 | 8/2010 | Ray | |
| 2011/0032821 A1 | 2/2011 | Morrill et al. | |
| 2011/0058479 A1 | 3/2011 | Chowdhury | |
| 2011/0075557 A1 | 3/2011 | Chowdhury et al. | |
| 2011/0075675 A1 | 3/2011 | Koodli et al. | |
| 2011/0116405 A1 | 5/2011 | Coppage et al. | |
| 2011/0289578 A1 | 11/2011 | Bugenhagen et al. | |
| 2011/0317580 A1 | 12/2011 | Kozisek et al. | |
| 2012/0127881 A1 | 5/2012 | Wiley et al. | |
| 2012/0127882 A1 | 5/2012 | Edwards et al. | |
| 2012/0182864 A1 | 7/2012 | Heinz et al. | |
| 2012/0201139 A1 | 8/2012 | Wiley et al. | |
| 2012/0201360 A1 | 8/2012 | Bugenhagen | |
| 2012/0230214 A1 | 9/2012 | Kozisek et al. | |
| 2012/0230328 A1 | 9/2012 | Morrill et al. | |
| 2012/0236729 A1 | 9/2012 | Heinz et al. | |
| 2012/0236750 A1 | 9/2012 | Bugenhagen et al. | |
| 2012/0254975 A1 | 10/2012 | Bugenhagen | |
| 2012/0257617 A1 | 10/2012 | Bugenhagen et al. | |
| 2012/0269089 A1 | 10/2012 | Morrill | |
| 2012/0314573 A1 | 12/2012 | Edwards et al. | |
| 2012/0320784 A1 | 12/2012 | Edwards et al. | |
| 2012/0321052 A1 | 12/2012 | Morrill et al. | |
| 2012/0327816 A1 | 12/2012 | Morrill et al. | |
| 2012/0330804 A1 | 12/2012 | Morrill et al. | |
| 2013/0033984 A1 | 2/2013 | McNaughton et al. | |
| 2013/0100797 A1 | 4/2013 | Ray et al. | |
| 2013/0135993 A1 | 5/2013 | Morrill et al. | |
| 2013/0145436 A1 | 6/2013 | Wiley et al. | |
| 2013/0182714 A1 | 7/2013 | Vachharajani et al. | |
| 2013/0185403 A1 | 7/2013 | Vachharajani et al. | |
| 2013/0185586 A1 | 7/2013 | Vachharajani et al. | |
| 2013/0286875 A1 | 10/2013 | Morrill | |
| 2013/0294243 A1 | 11/2013 | Wiley et al. | |
| 2013/0301460 A1 | 11/2013 | Bugenhagen et al. | |
| 2013/0322249 A1 | 12/2013 | Heinz et al. | |
| 2013/0322265 A1 | 12/2013 | Kozisek et al. | |
| 2013/0322432 A1 | 12/2013 | Wiley et al. | |
| 2014/0043977 A1 | 2/2014 | Wiley et al. | |
| 2014/0043999 A1 | 2/2014 | Bugenhagen | |
| 2014/0050106 A1 | 2/2014 | McNaughton et al. | |
| 2014/0064086 A1 | 3/2014 | Wiley et al. | |
| 2014/0064100 A1 | 3/2014 | Edwards et al. | |
| 2014/0071977 A1 | 3/2014 | Morrill et al. | |
| 2014/0194068 A1 | 7/2014 | Coppage et al. | |
| 2014/0226485 A1 | 8/2014 | Heinz et al. | |
| 2014/0241153 A1 | 8/2014 | Chowdhury | |
| 2014/0297847 A1 | 10/2014 | Heinz et al. | |
| 2014/0321273 A1 | 10/2014 | Morrill et al. | |
| 2014/0341049 A1 | 11/2014 | Bugenhagen | |
| 2015/0110097 A1 | 4/2015 | Morrill et al. | |
| 2015/0124809 A1 | 5/2015 | Edsall et al. | |
| 2015/0138955 A1 | 5/2015 | Wiley et al. | |
| 2015/0264187 A1 | 9/2015 | Wiley et al. | |
| 2015/0295998 A1 | 10/2015 | Morrill et al. | |
| 2015/0312283 A1 | 10/2015 | Edwards et al. | |
| 2015/0326732 A1 | 11/2015 | Wiley et al. | |
| 2015/0373061 A1 | 12/2015 | Wiley et al. | |
| 2016/0057062 A1 | 2/2016 | Heinz et al. | |
| 2016/0080272 A1 | 3/2016 | McNaughton et al. | |
| 2016/0134502 A1 | 5/2016 | Edwards et al. | |
| 2016/0204983 A1 | 7/2016 | Huynh Van et al. | |
| 2016/0330125 A1* | 11/2016 | Mekkattuparamban | H04L 12/4633 |
| 2016/0359697 A1* | 12/2016 | Scheib | G06F 16/122 |
| 2016/0380878 A1 | 12/2016 | Bugenhagen et al. | |
| 2017/0339217 A1 | 11/2017 | Morrill et al. | |
| 2018/0048549 A1 | 2/2018 | Edwards et al. | |
| 2018/0097853 A1 | 4/2018 | Wiley et al. | |
| 2018/0367388 A1 | 12/2018 | Pani et al. | |
| 2018/0367404 A1 | 12/2018 | Harneja | |
| 2019/0044818 A1 | 2/2019 | Nolan et al. | |

FOREIGN PATENT DOCUMENTS

| | | |
|---|---|---|
| CA | 2656552 A1 | 8/2008 |
| CN | 101523812 A | 9/2009 |
| CN | 101523845 A | 9/2009 |
| CN | 101595666 A | 12/2009 |
| IL | 196283 A | 9/2013 |
| IL | 196284 A | 9/2014 |
| IL | 196285 A | 9/2015 |
| WO | 2008005393 A2 | 1/2008 |
| WO | 2008013649 A2 | 1/2008 |
| WO | 2008024387 A2 | 2/2008 |
| WO | 2008030292 A2 | 3/2008 |
| WO | 2008049115 A2 | 4/2008 |
| WO | 2008049117 A1 | 4/2008 |
| WO | 2008097254 A1 | 8/2008 |

(56) References Cited

FOREIGN PATENT DOCUMENTS

| | | |
|---|---|---|
| WO | 2010068698 A3 | 9/2010 |
| WO | 2011038352 A1 | 3/2011 |
| WO | 2011038359 A2 | 3/2011 |

* cited by examiner

SYSTEM RESOURCE MANAGEMENT IN SELF-HEALING NETWORKS

TECHNICAL FIELD

Embodiments presented in this disclosure generally relate to network fabrics that serve several endpoint groups with various different security policies. More specifically, embodiments disclosed herein relate to offloading the application of security policies to balance computing resources within the network fabric.

BACKGROUND

In a Software Defined Network (SDN), as switches are added to the network or switches are removed from the network over time, the network may develop heterogeneously to include a variety of different devices with different computing capabilities and resource levels. The different performance characteristics of the switches in the network may result in an uneven allocation of computing resources and an inefficient handling of networked communications, especially when the host devices connected to the switches are not reconnected to account for new switch layouts. Users of SDNs, however, still expect the security policies and networking capabilities to be evenly applied across the network despite the heterogeneous hardware available in the network with different performance characteristics.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
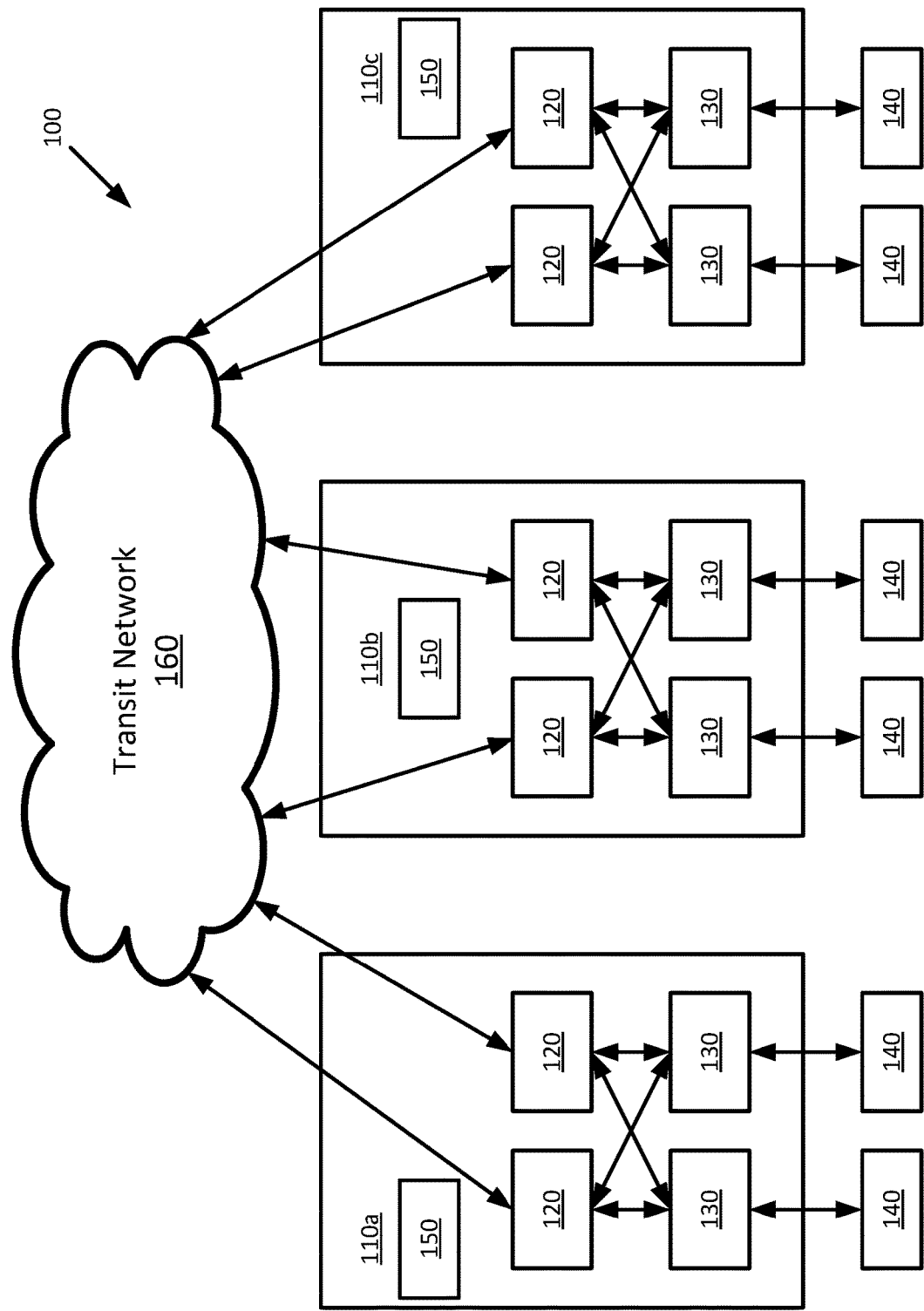
FIG. 1 illustrates a network fabric, according to embodiments of the present disclosure.

One embodiment presented in this disclosure provides a method for system resource management in self-healing networks that includes: establishing a network tunnel between a first switch and a second switch in a network fabric, wherein the second switch enforces security policies for a policy group including a first Endpoint Group (EPG) that are physically connected to the first switch; in response to receiving a communication from the first EPG at the first switch intended for a destination, the communication including a source IP address of the first switch and a Virtual Private Network (VPN) Routing and Forwarding identifier (VRF ID) of the first EPG: modifying the source IP address with a port offset associated with a port of the first switch to which the first EPG is connected, modifying the VRF ID with a group offset associated with an identity of the policy group, and transmitting the communication via the network tunnel from the first switch to the second switch; and in response to receiving the communication over the network tunnel at the second switch from the first switch: identifying the security policies for the policy group based on the group offset, and in response to determining that the communication is permitted by the security policies, transmitting the communication to the destination.

One embodiment presented in this disclosure provides a non-transitory computer readable storage device including instructions that when performed by a processor, enable the processor to perform an operation for system resource management in self-healing networks that includes: establishing a network tunnel between a first switch and a second switch in a network fabric, wherein security policies for a policy group including a first Endpoint Group (EPG) physically connected to the first switch are offloaded to the second switch to implement; setting a port offset, based on a port of the first switch to which the first EPG is connected; setting a group offset based on an identity of the policy group; in response to receiving a communication from the first EPG at the first switch intended for a destination, the communication including a source IP address of the first switch and a Virtual Private Network (VPN) Routing and Forwarding identifier (VRF ID) that the first EPG belongs to: modifying the source IP address with the port offset; modifying the VRF ID with the group offset; and transmitting the communication via the network tunnel from the first switch to the second switch; and in response to receiving the communication over the network tunnel at the second switch from the first switch: identifying the security policies for the policy group based on the group offset; and in response to determining that the communication is permitted by the security policies, transmitting the communication to the destination.

One embodiment presented in this disclosure provides a method for system resource management in self-healing networks that includes: grouping a first plurality of End Point Groups (EPGs) into a first plurality of policy groups based on shared security policies, wherein the first plurality of EPGs is connected to a plurality of switches in a network; identifying a first policy group with a highest resource demand of the first plurality of policy groups; assigning a first security policy corresponding to the first policy group to a first switch of the plurality of switches; identifying a second plurality of EPGs from the remaining EPGs of the first plurality of EPGs that were not included in the first policy group; grouping the second plurality of EPGs into a second plurality of policy groups based on shared security policies; identifying a second policy group with a highest resource demand of the second plurality of policy groups; and assigning a second security policy corresponding to the second policy group to a second switch of the plurality of switches.

Example Embodiments

To ensure that users are provided a homogeneous networking experience as the hardware in an SDN (Software Defined Network) evolves into a heterogeneous deployment, the present disclosure provides for placement guidance of system resources in a network with new or rebalanced network configurations without requiring manual user configuration of the network.

A network controller offloads the implementation or performance of various communications policies from a network device connected to various hosts to another network device with greater available computing resources. The network controller determines the most efficient pairing of network devices and grouped hosts with similar security policies or operating characteristics in an iterative process based on a z-score weighted composite metric for the free resources on a given network device and the demands of a set of grouped hosts on those resources.

FIG. 1 illustrates a network fabric 100, according to embodiments of the present disclosure. The illustrated network fabric 100 is an SDN that includes a first site 110a (generally, site 110), a second site 110b, and a third site 110c, where each of the sites 110 are located at different geographic locations from one another (i.e., are remotely located). Although three sites 110a-c are discussed in the examples herein, a network fabric 100 may include more than or fewer than three sites 110 in other examples. Each of the sites 110 is connected to the other sites 110 in the network fabric 100 via a network 160, such as the Internet or another public network, to operate as a single network despite the distances between remotely located elements.

In FIG. 1, each site 110 includes various spine switches 120 and leaf switches 130 that may be divided into various clusters based on communication paths, tenants of the site 110, etc. The spine switches 120 and the leaf switches 130 are specialized computer networking devices for routing data within a network. Example hardware that may be used in a spine switch 120 or leaf switch 130 is discussed in relation to FIG. 6.

In the illustrated Clos architecture, the leaf switches 130 route communication flows through the spine switches 120, and the spine switches 120 route communication flows through the leaf switches 130 in. Stated differently, within a site 110, the spine switches 120 are not in direct communication with other spines switches 120 and the leaf switches 130 are not in direct communication with other leaf switches 130, but route communications through one another. In the illustrated network fabric 100, the spine switches 120 in remote sites 110 are communicated together to link the sites 110 over the public network 160 into the network fabric 100. Although each of the spine switches 120 are illustrated as being connected to each of the leaf switches 130 in a given site 110 in FIG. 1, other arrangements are contemplated.

Various host devices 140 are connected to the leaf switches 130, and host the workloads for various tenants. The host devices 140 may provide services or clients for various tenants of the network fabric 100, and although one host device 140 is illustrated in FIG. 1 for each leaf switch 130, it will be appreciated that the network fabric 100 may include a plurality of host devices 140, wherein each individual host device 140 is connected to one port of an individual leaf switch 130. Each leaf switch 130 may include a plurality of ports and may be connected to one or a plurality of host devices 140 by those ports, which may be allocated to one or a plurality of different tenants.

Communications routed from one leaf switch 130 to another leaf switch 130 in the network fabric 100 (via one or more spine switches 120 at one site 110 or across multiple sites 110) are encapsulated into a tunnel that identifies the address of the source leaf switch 130 and the address of the destination leaf switch 130 for routing the communication. The communication also includes a class identifier (ID) of the source workload or host device 140 (or an endpoint group ID) and the network ID (or subnetwork ID) of the source workload or host device 140. Because several different tenants may share computing resources provided in a given site 110, and tenants may wish to manage communications between the workloads associated with a particular tenant, these communications may be encrypted and/or the tenants may specify various security policies for how communications are to be handled. A security policy may, for example: allow a first workload to communicate with a second workload, may block communications from a first workload from being received by a second workload, may limit a first workload to receive communications only from known sources (e.g., a whitelist), may block a fist workload from receiving communication from known sources (e.g., a blacklist), etc. When a security policy blocks a communication or otherwise prevents a communication from being received by a given workload, the communication may be dropped, ignored, quarantined (e.g., held or forwarded to a different device for analysis), or forwarded to a different device or workload than the originally specified destination.

When security policies are implemented at the leaf switches 130, the determination to allow an incoming packet to reach an intended workload results in the leaf switches 130 delivering the packet to an indicated host device 140, blocking the packet from being received by an indicated host device 140, or forwarding the packet to a different host device 140 or node (e.g., a quarantine device). In a multi-tenant SDN, where multiple parties share some or all of the hardware of the network fabric 100, such as in a data center, the network fabric 100 may be divided into several Virtual Private Network Routing and Forwarding (VRF) groups (also referred to as VRFs) for managing the workloads and security policies of individual tenants. The workloads and/or host devices 140 used by the different tenants are grouped into one or more End Point Groups (EPG) that collect the workloads and/or host devices 140 that have the same networking and policy needs. In some embodiments, an EPG represents all of the workloads connected to an individual port of a specific leaf switch 130. In other embodiments, a subnet, VLAN (Virtual Local Area Network) identifier, IP (Internet Protocol) address, MAC (Media Access Control) address, Virtual Machine host name, etc., and combinations thereof can be used to group one or more endpoints into an EPG.

Figure 2:
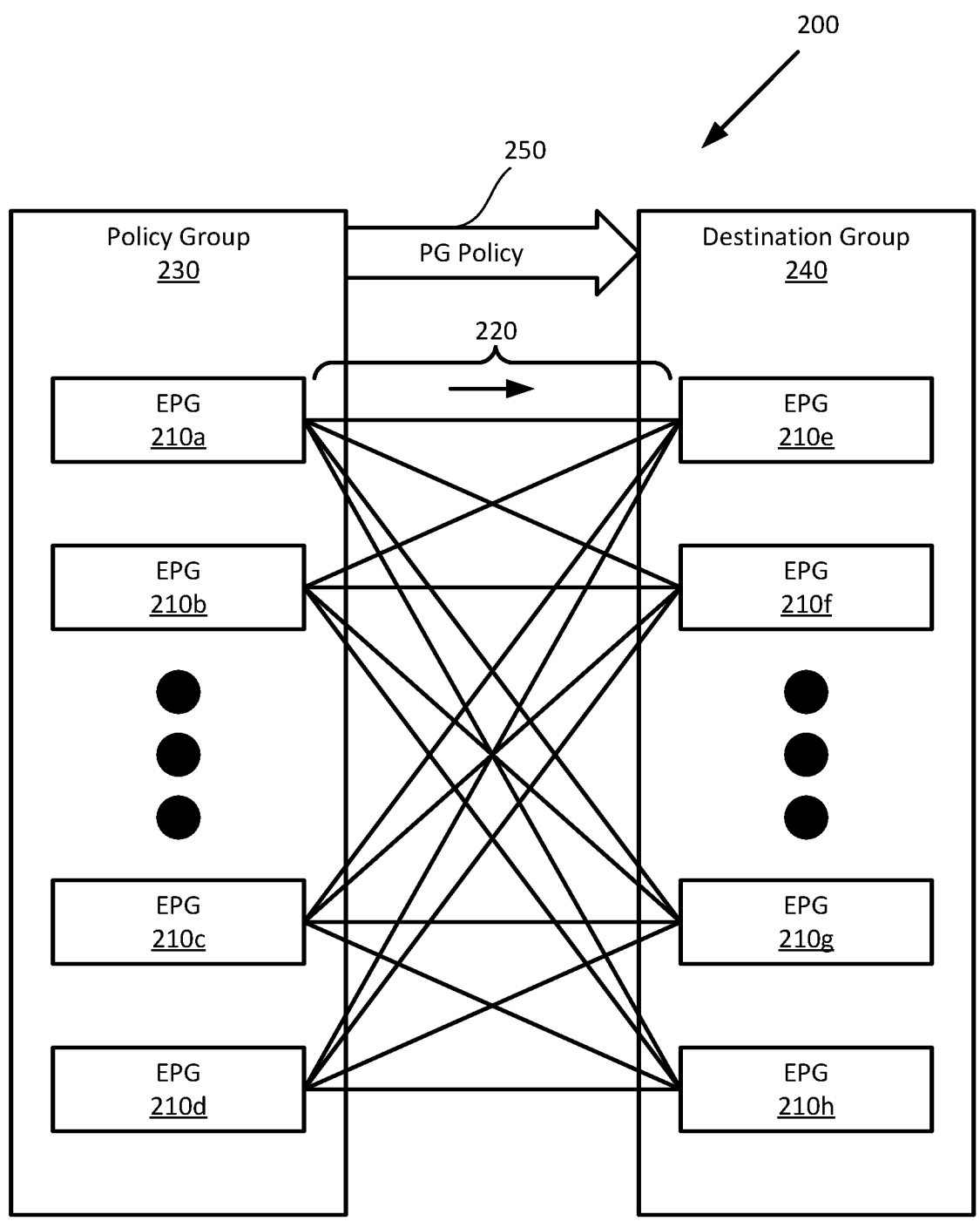
FIG. 2 illustrates a policy grouping, as may be used in policy flattening, according to embodiments of the present disclosure.

FIG. 2 illustrates a policy grouping 200, as may be used in policy flattening, according to embodiments of the present disclosure. As shown, a first set of EPGs 210 (particularly, EPGs 210a-210d) have been setup via security policies to permit communication channels 220 to a second set of EPGs 210 (particularly, EPGs 210e-h). Each EPG 210 in the first set is permitted by a unidirectional security policy to send communications over the communication channels 220 to every EPG 210 included in the second set. As used herein, the first set of EPGs 210 defines a policy group (PG) 230 that has the same security policies as one another, which allow communication channels 220 to a destination group (DG) 240 that includes the second set of EPGs 210. The EPGs 210 in the PG 230 may belong to one complete VRF, a subset of one VRF, or may belong to multiple VRFs, but have the same security policies. The EPGs 210 in the DG 240 may belong to one complete VRF, a subset of one VRF, or may belong to multiple VRFs, and may have the same or different security policies from one another.

Although the communication channels 220 are described as unidirectional (i.e., permitting communication from the first set of EPGs 210 to the second set of EPGs 210), in some embodiments the second set of EPGs 210 include a reciprocal set of security policies for permitting communications to the first set of EPGs 210. In such embodiments, the illustrated destination group 240 may be considered to be a second policy group 230 and the illustrated policy group 230 may be considered to be a second destination group 240.

Each communication channel 220 is associated with a security policy that permits communication from an EPG 210 in the PG 230 to an EPG 210 in the DG 240. For example, the first EPG 210a is permitted to communicate with the fifth through eighth EPGs 210e-h via four communication channels 220, each associated with a security policy maintained by the leaf switch 130 hosting the first EPG 210a. For a PG 230 of X EPGs 210 permitted to communicate with a DG 240 of Y EPGs 210, X*Y security policies are maintained to allow the X*Y communication channels 220 to be established. For example, as illustrated in FIG. 2, a PG 230 of four EPGs 210a-d and a DG 240 of four EPGs 210e-h has sixteen communication channels 220 (i.e., 4*4=16), each associated with a security policy maintained on a leaf switch 130.

By establishing the first set of EPGs 210a-d as belonging to a PG 230 and the second set of EPGs 210e-h as belonging to a DG 240, the security policies can be flattened into one PG policy 250 to describe the allowed communications channels 220 of the individual policies. For example, instead of maintaining X*Y security policies that describe all of the X*Y permitted communication channels 220 between the associated EPGs 210, the PG policy 250 defines one policy that allows communications from the PG 230 to be sent to the DG 240 without reference to the individual EPGs 210 therein.

By flattening the security polices into a PG policy 250, the number of security polices needed to be maintained in the memory of the leaf switches 130 is reduced, thus conserving computing resources. However, if the individual EPGs 210 are spread across multiple leaf switches 130 that manage the security policies, multiple copies of the PG policy 250 will be maintained by the collection of leaf switches 130 managing the security policies; diminishing some of the benefits of policy flattening. For example, if EPG 210a is managed by a first leaf switch 130a, and EPGs 210b-d are managed by a second leaf switch 130b, two copies of the PG policy 250 are created and maintained; one at the first leaf switch 130a and one at the second leaf switch 130b.

Additionally, although a given EPG 210 can conceptually belong to several different candidate PGs 230, in practice, an administrator or controller assigns the EPG 210 to one selected PG 230 of the candidate PGs 230 when flattening security policies, and a suboptimal assignment may diminish the benefits of policy flattening (e.g., resulting in more PGs 230, PGs 230 spread across more leaf switches 130, inefficient allocation of leaf switch computing resources). For example, the first EPG 210a may potentially belong to n PGs 230, but has been assigned to the illustrated PG 230 with the second through fourth EPGs 210b-d, which may be the most efficient assignment of the first EPG 210a to one of the n candidate PGs 230.

Accordingly, optimizing the assignment of EPGs 210 into PGs 230 and the assignment of PGs 230 to leaf switches 130 can improve/maximize the overall benefits to the network fabric 100 of policy flattening. Although the assignment of EPGs 210 may include changing which host device 140 in the network fabric 100 hosts the workloads in an EPG 210 or which leaf switch 130 a given host device 140 is connected to, in self-healing embodiments, such as those described in the present disclosure, the assignment of EPGs 210 includes offloading the EPGs 210 from one leaf switch 130 to another 130.

Figure 3:
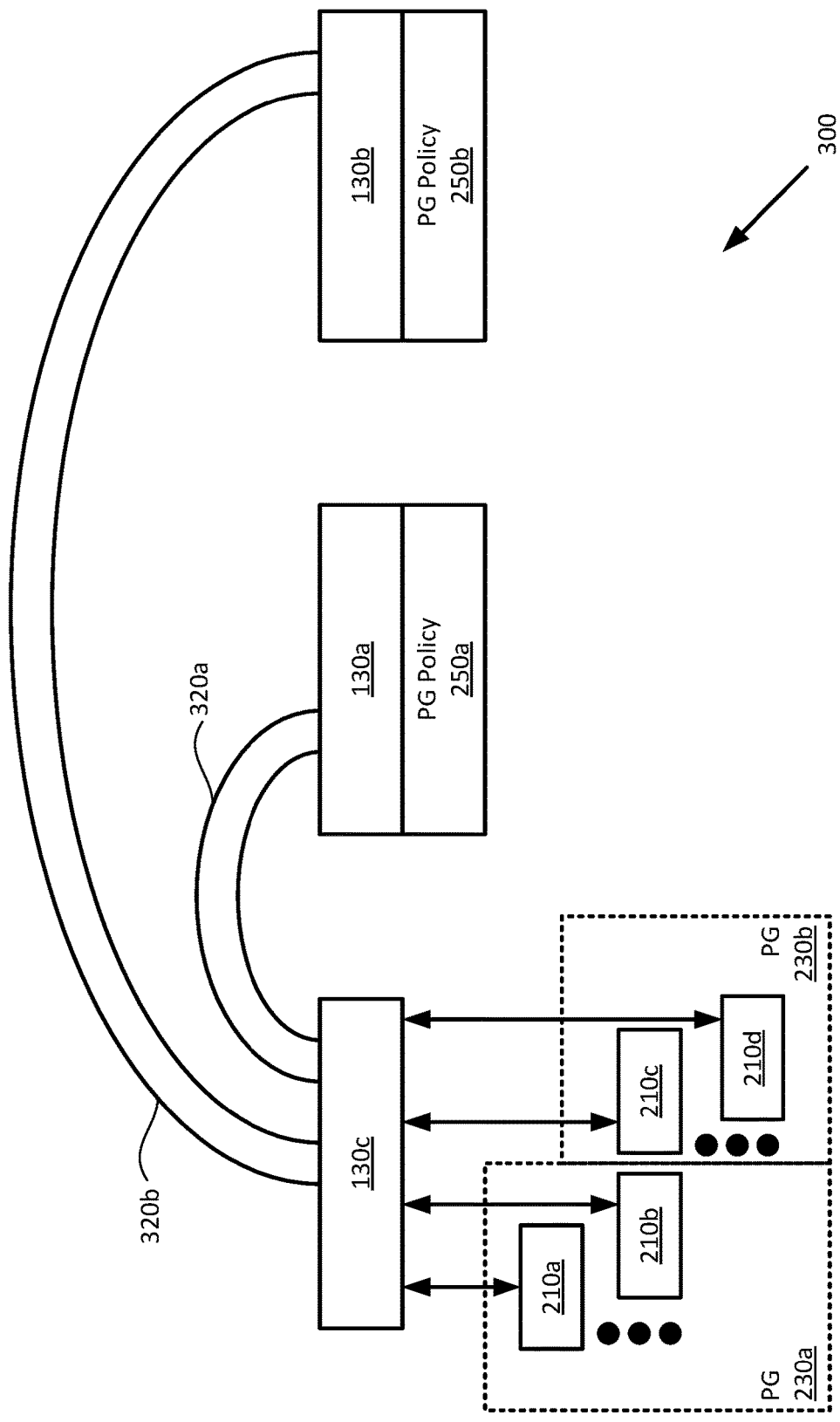
FIG. 3 illustrates an offload operation, according to embodiments of the present disclosure.

FIG. 3 illustrates an offload operation 300, according to embodiments of the present disclosure. In FIG. 3, three leaf switches 130a-c are shown, with first through fourth EPGs 210a-210d illustrated as being physically connected to a third leaf switch 130c (e.g., by host devices 140 providing the workloads of the EPGs 210). As illustrated, the first through second EPGs 210a and 210b belong to a first PG 230a, which has an associated first PG policy 250a offloaded to the first leaf switch 130a. Similarly, the third through fourth EPGs 210c-d belong to a second PG 230b, which has an associated second PG policy 250b offloaded to the second leaf switch 130b.

A first tunnel 320a (generally, tunnel 320) links the first leaf switch 130a with the third leaf switch 130c, and a second tunnel 320b links the second leaf switch 130b with the third leaf switch 130c. In a Clos architecture for a network fabric 100, such as is illustrated in FIG. 1, the tunnels 320 may transit between the leaf switches 130 via one or more spine switches 120 (not illustrated) and/or the public network 160 (not illustrated) depending on the physical locations of the leaf switches 130. To ensure proper routing for communications whose EPGs 210 belong to a PG 230 having a PG policy 250 offloaded to another leaf switch 130, the third leaf switch 130c redirects communications received from the connected EPGs 210 to the leaf switches 130 that maintain the PG policy 250 for the associated PG 230.

The third leaf switch 130c, as a message source or a connected switch, includes additional addressing information in the communications sent to the offloaded switches (e.g., the first leaf switch 130a or the second leaf switch 120b in FIG. 3) so that the communications can be properly analyzed and directed to/from the requesting host. In several embodiments, the addressing information includes a source IP address S that is modified with a port offset that identifies the port number P that the transmitting EPG 210 is connected to on the source switch, a destination address D of the switch handling policy enforcement, a network identifier V of the VRF that the EPG 210 belongs to that is modified with a group offset G that identifies the PG 230 that the EPG 210 belongs to, and a class identifier C assigned to the EPG 210. An example tuple for the addressing information may thus be represented as: [S+P, D, V+G, C]. For example, when a packet from the EPG 210 connected to port 2 (P=2) at a leaf switch 130 with IP address 10.0.0.1 (S=10.0.0.1), the leaf switch 130 may add the port offset to the IP address to yield a source IP address of 10.0.0.3 for transmission to the destination switch. The connected switch uses the addressing information when encapsulating communications from the EPG 210 for transmission over the network tunnel 320 to the offloaded switches, and the encapsulated communications include the IP address of the EPG 210, an IP address (or other identifier) of a destination for the communication, as well as the payload of the communication, error correction/identification information, and the like.

Other arrangements of the addressing information and predefined relationships for how the individual elements are combined are contemplated in other embodiments. For example, the port number P may be subtracted from the second byte of the address instead of being added to the first byte of the address. Accordingly, although the examples in the present disclosure are given primarily in relation to IP version four (IPv4) addresses, IP version six (IPv6) address are also contemplated.

When the offload switch receives an outbound communication via the network tunnel 320, the offloaded switch decapsulates the communication (e.g., removes tunnel header and footer fields) and identifies the security policies to apply to the communication. Additionally, the offload switch conversationally learns from the addressing information that the source IP address, as modified by the port offset, is associated with the IP address of the EPG 210 indicated in the decapsulated communication. The offload switch uses the VRF ID, as modified by the group offset, from the communication to identify the security policy to apply to the communication, to permit or block transmission of the communication to the destination indicated in the decapsulated packet. The offload switch uses the IP address of the EPG 210 when transmitting the decapsulated communication to the destination, and uses the known association between the modified source IP address and EPG IP address when handling inbound messages to the EPG 210 (e.g., a response from the destination or a different party).

When an offload switch receives an inbound message for a given EPG 210, the offload switch identifies the modified source IP address associated with the destination IP address indicated in the message (e.g., the EPG IP address) and encapsulates and forwards the message to the connected switch to handle. Once the message is received at the connected switch (e.g., the third leaf switch 130*c*), the connected switch decapsulates the message (e.g., removes tunnel header and footer fields) and removes the source IP address of the connected switch from the modified source IP address indicated by the offload switch to produce the port offset. The connected switch then forwards the message to the EPG 210 connected to the port of the connected switch indicated by the port offset. Accordingly, the connected switch can forego using an endpoint table that lists and correlates every port that every endpoint is connected to, and instead us a mapping table that correlates PGs 230 (comprising several EPGs 210 connected to a particular port) to the ports, thus reducing the number of entries maintained in memory and freeing space in the endpoint table.

Although a given number of leaf switches 130, EPGs 210, and PGs 230 (with associated PG policies 250) are shown in FIG. 3, more or fewer of these elements may be included in other embodiments. For example, various additional EPGs 210 (not illustrated) may be connected to the ports of the first leaf switch 130*a* or the second leaf switch 130*b*. In another example, various additional EPGs 210 belonging to a third PG 230*c* (not illustrated) may be connected to the third leaf switch 130*c*, which handles security policies for the third PG 230*c* locally (i.e., does not offload the third PG policy 250*c* (not illustrated) to a different leaf switch 130).

Figure 4:
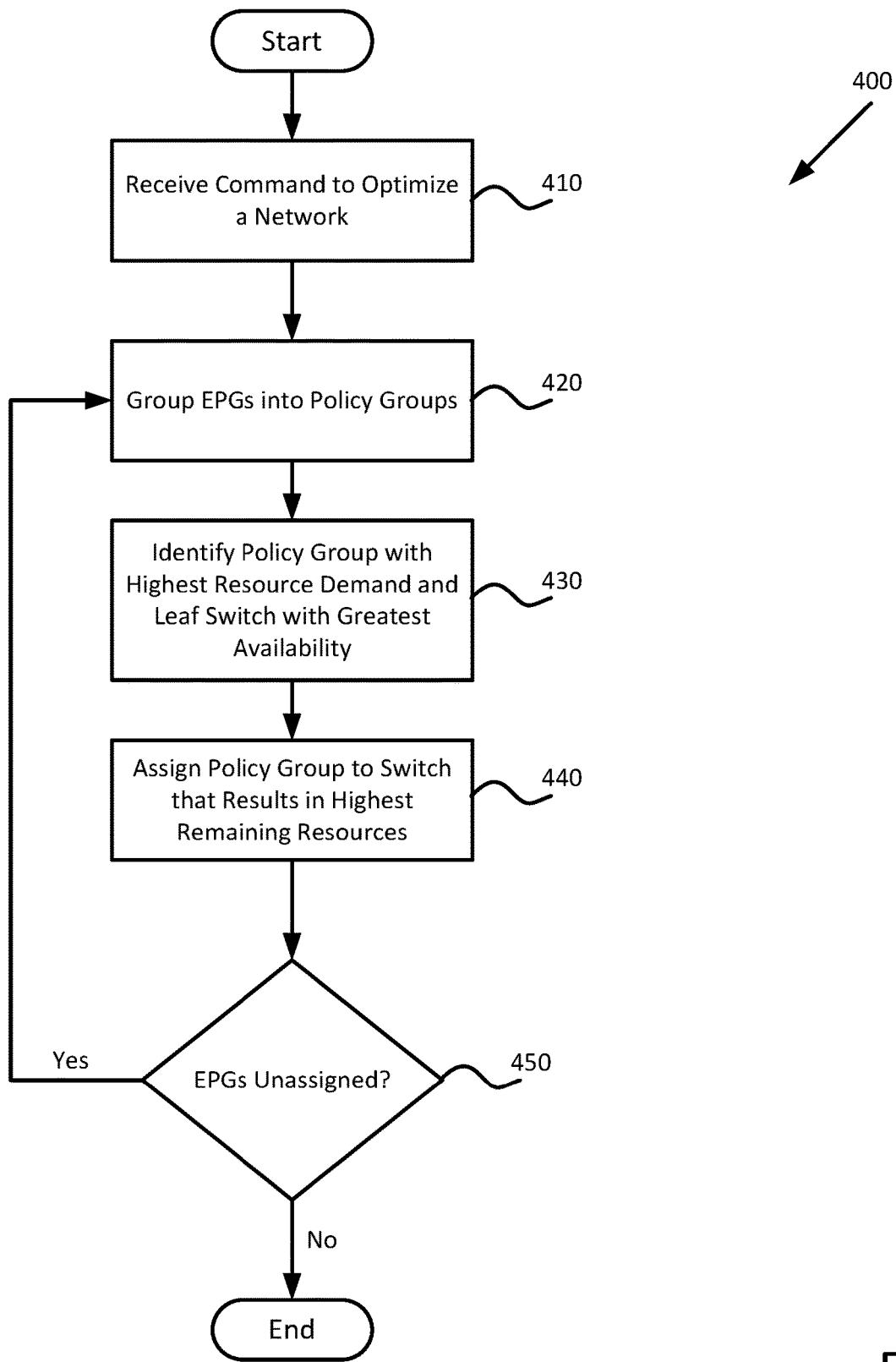
FIG. 4 is a flowchart for optimizing a network fabric, according to embodiments of the present disclosure.

FIG. 4 is a flowchart of a method 400 for optimizing a network fabric 100, according to embodiments of the present disclosure. Method 400 begins with block 410, where a network controller in the network fabric 100 receives a command to optimize the network fabric 100. In some embodiments, a network controller receives a manually indicated command from an administrator to optimize the network fabric 100. In other embodiments, such as in self-healing networks, the network controller recognizes the addition of a new switch to the network fabric 100, the removal of an existing switch from the network fabric 100, or a reconfiguration of an existing switch (either in adjusting physical connections to other devices or updates to software running thereon) as a command to optimize the network fabric 100, and begin method 400 accordingly.

Method 400 repeats through several iterations of blocks 420 through 450 to allow the network controller to recursively group, analyze, and assign the EPGs 210 in the network fabric 100 to develop and deploy PGs 230 as efficiently as possible given the computing and networking resources available during each iteration of blocks 420 through 450.

At block 420, the network controller groups the EPGs 210 in the network fabric 100 into a plurality of PGs 230. Each PG 230 in the plurality for a given iteration of block 420 includes one or more EPGs 210 that have not been assigned in an earlier iteration of blocks 420-450 to a leaf switch 130. Therefore, for an initial or first iteration of block 420, all of the EPGs 210 connected to the network fabric 100 are grouped into PGs 230 in an initial or first plurality, but in subsequent iterations, fewer than all of the EPGs 210 are grouped into subsequent pluralities of PGs 230.

The network controller may group one EPG 210 into several different PGs 230 based on different grouping rules or strategies. In some embodiments, the EPGs 210 are grouped into particular PGs 230 based on having identical security policies with one another. For example, a first EPG 210*a* with security policy A, a second EPG 210*b* with security policy A, and a third EPG 210*c* with security policy A can be grouped together in a first PG 230*a*, but a fourth EPG 210*d* with security policy B would not be grouped into the first PG 230*a*, due to the different security policy. In some embodiments, a PG 230 includes all of the EPGs 210 connected to a given port of a leaf switch 130. In other embodiments, the EPGs 210 are grouped into particular PGs 230 based on having shared characteristics with one another, but do not require having a full set of identical characteristics. For example, the network controller may evaluate whether a set of EPGs 210 belong to the same VRF, whether the EPGs 210 communication with one another, whether the EPGs 210 communication with the same DG 240, etc.

At block 430, the network controller identifies the PG 230 of the plurality developed at block 420 with the highest resource demand on the available resources of the network fabric 100 in the current iteration. For each candidate PG 230 created in the plurality for the given iteration, the network controller simulates the resource consumption and the saved resources for assigning that candidate PG 230 to each available leaf switch 130 in the network fabric 100. The network controller compares the consumption of resources including the Content Addressable Memory space, Local Area Network table space, endpoint table space, and route table space consumed on each leaf switch 130 by each candidate PG 230, and identifies the given PG 230 and given leaf switch 130 that results in the greatest saving of resources in the network fabric 100.

In many cases, the PGs 230 that result in the greatest saving of resources in the earlier iterations of method 400 include more EPGs 210 than the PGs 230 that result in the greatest saving of resources in later iterations. Eventually, the plurality of PGs 230 developed for a given iteration may include PGs 230 including a single EPG 210 each. To determine where to assign the single-EPG PGs 230, the network controller ranks the remaining leaf switches 130 with a dynamic weighting of the remaining resources based on the needs of the remaining unassigned EPGs 210.

In one embodiment, the network controller uses a composite ranking of resource usage to determine how to rank the leaf switches 130 to select which leaf switch 130 to place a particular PG 230 on. For example, where $w_j$ is the rank exponent weight for a tracked resource j, $r_j$ is the current usage of resource j, and resource j is selected from out of n resources, the network controller may determine a composite metric C for each leaf switch 130 according to Formula 1 below.

$$C = \sum_{j=1}^{n} w_j r_j \qquad (1)$$

The network controller calculates the composite metric C for each leaf switch 130 and identify the leaf switch 130 with the highest value composite metric C to assign a particular PG 230 to.

To calculate the rank exponent weight $w_j$ for each resource on a particular leaf switch 130, the network controller examines the usage rate of each tracked resource on the leaf switch 130 relative to the mean resource usage rate for every tracked resource on that leaf switch 130. For example, the network controller may calculate a z-score for resource i based on a usage rate $r_i$, a mean usage rate p for all resources on the leaf switch 130, and a standard deviation a of the individual resource's usage rate from the mean usage rate according to Formula 2 below.

$$z_i = \frac{r_i - \mu}{\sigma} \qquad (2)$$

For example, where the network controller tracks four resources A, B, C, and D, with respective usage rates ($r_i$) of 90%, 88%, 82%, and 77%, the mean usage rate (μ) would be 84.25% and the standard deviation (σ) would be 5.9. Then, according to Formula 2, $z_A$=0.97, $z_B$=0.63, $z_C$=−0.38, and $z_D$=−1.2.

Once the z-score is calculated, the network controller may then determine the rank exponent weight wi for the particular resource i. For example, the network controller may calculate wi based on the number of resources tracked n, the usage rate ri of the individual resource, the z score for the individual resource i, and a normalization factor based on the summation of the individual usage rates and z scores of individual resources n according to Formula 3 below.

$$w_i = \frac{(n - r_i + 1)^{z_i}}{\sum_{j=1}^{n}(n - r_j + 1)^{z_j}} \qquad (3)$$

At block 440, the network controller assigns the PG 230 identified in block 430 to the leaf node identified in block 430. The network controller creates or moves the security policies for the assigned PG 230 onto the assigned leaf switch 130. In various embodiments, the security policies for the PG are flattened on the assigned leaf switch 130 when the EPGs 210 share security policies. When the leaf switch 130 to which the PG 230 is assigned is not the leaf switch 130 to which the EPGs 210 of the PG 230 are physically connected to, the network controller creates a rule on the connected leaf switch 130 to forward communications from the connected leaf switch 130 to the assigned (offload) leaf switch 130.

At block 450, the network controller determines whether any EPGs 210 remain unassigned to leaf switches 130. In response to determining that not all EPGs 210 have been assigned to leaf switches 130, method 400 may return to block 420 to begin a new iteration of grouping the unassigned EPGs 210 into a new plurality of PGs 230 to determine which leaf switch 130 to assign those EPGs 210 to. In response to determining that all EPGs 210 have been assigned to leaf switches 130, method 400 may then conclude.

Figure 5A:
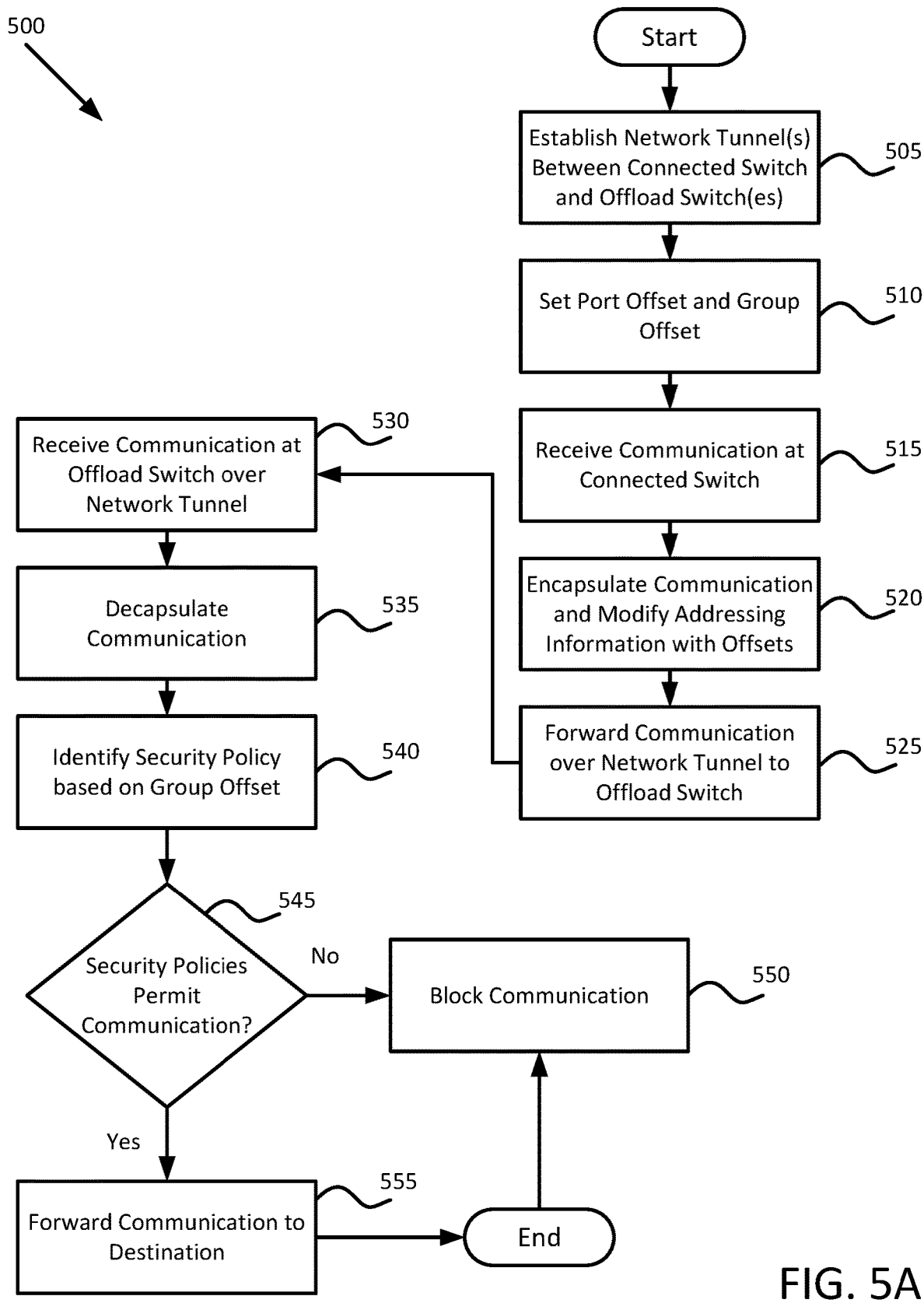
FIG. 5A is a flowchart for handling outbound communications from an Endpoint Group in an optimized network fabric, according to embodiments of the present disclosure.
Figure 5B:
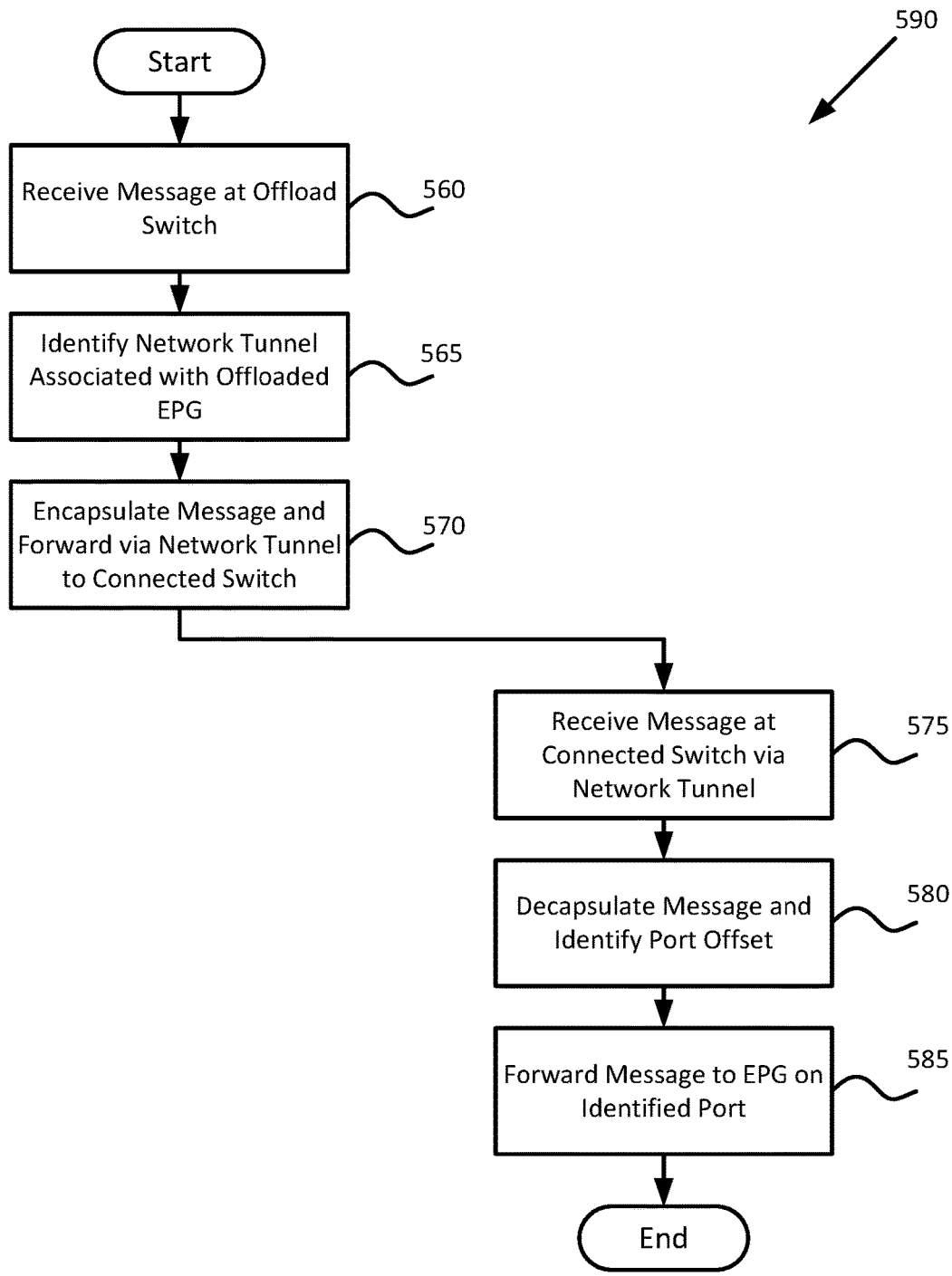
FIG. 5B is a flowchart for handling inbound messages to an Endpoint Group in an optimized network fabric, according to embodiments of the present disclosure.

FIG. 5A is a flowchart of a method 500 for handling outbound communications from an EPG 210 in an optimized network fabric 100, according to embodiments of the present disclosure. FIG. 5B is a flowchart of a method 590 for handling inbound messages to an EPG 210 in an optimized network fabric 100, according to embodiments of the present disclosure. In the optimized network fabric 100, the security policies for one or more EPGs 210 are offloaded from the leaf switch 130 to which the EPGs 210 are connected (i.e., a connected switch) to one or more other leaf switches 130 that are determined to more efficiently provide the networking and computing resources to handle implementing those security policies (i.e., offload switch(es)). In some embodiments, a network controller determines which leaf switches 130 are to be offload switches for specified PGs 230 of EPGs 210 according to method 400 discussed in regard to FIG. 4. Method 500 may begin in response to the conclusion of method 400.

Method 500 begins at block 505, where the connected switch establishes network tunnels 320 to the offload switches handling security policies for the connected switch. In various embodiments, the network tunnels 320 are VPN tunnels established between the switches to handle traffic between two leaf switches 130, and may include one or more spine switches 120 and/or a public network 160.

At block 510, the connected switch sets a port offset and a group offset for the EPG 210. The port offset is based on the port of the connected switch to which the EPG 210 is connected. The port offset, when added to the IP address of the connected switch in incoming messages, enables the connected switch to identify which port to route inbound messages to the EPG 210 without use of a routing table. The group offset is based on an identifier for the PG 230 to which the EPG 210 belongs, and each PG 230 connected to the connected switch has a unique group identifier. The group identifier, when added to the VRF ID in outbound communications, enables the offload switches to identify which subset of the VRF the EPG 210 belongs to and thereby identify the PG policy 250 to apply to the communication.

At block 515, the connected switch receives an outbound communication from the EPG 210 directed to a destination (e.g., a different EPG 210 in the network fabric 100, a host outside of the network fabric 100). The connected switch encapsulates (e.g., with a VPN header) the outbound communication for transmission over the network tunnel 320 to the offload switch assigned to handle security policies for the PG 230 that the EPG 210 belongs to. The connected switch, in the header or routing fields of the encapsulated communication, modifies the addressing information with the offsets set in block 510. The connected switch modifies the source IP address of the connected switch indicated in the header by the port offset according to a predefined rule (e.g., by adding, subtracting, multiplying, or applying another reversible mathematical operation with a designated portion or byte in the IP address and the port number). The connected switch modifies the VRF ID of the EPG 210 indicated in the header by the group offset according to a predefined rule (e.g., by adding, subtracting, multiplying, etc. a designated byte in the VRF ID address by the identity of the PG 230 to which the EPG 210 belongs).

At block 525, the connected switch forwards the encapsulated communication over the network tunnel 320 to the offload switch, and at block 530, the offload switch receives the encapsulated communication over the network tunnel 320.

At block 535, the offload switch decapsulates the communication received over the network tunnel 320 to access the original outbound communication. In various embodiment, the offload switch conversationally learns from the encapsulation header information and the header information of the original outbound communication an association between the IP address of the EPG 210 (indicated as an IP address in the original outbound communication) and the IP address of the connected switch, as modified by the port offset. The association between the two IP addresses may be stored in a routing or forwarding table on the offload switch to properly direct inbound messages for the EPG 210, which is discussed in greater detail in regard to method 590 and FIG. 5B. For example, when the offload switch receives a VPN packet encapsulating the original communication, the offload switch associates the source IP address in the header and routing information of the VPN packet (e.g., the modified source IP address of the connected switch) with the source EPG IP address in the header and routing information of the decapsulated communication.

At block 540, the offload switch identifies the security policy to apply to the outbound communication based on the group offset. In various embodiments, a PG policy 250 stored on the offload switch is associated with the VRF ID as modified by the group offset, and the offload switch identifies the PG policy 250 based on the modified VRF ID.

At block 545, the offload switch applies the identified security policy to determine whether the outbound communication is permitted or otherwise allowed to be sent to the destination indicated in the outbound communication. The security policy may specify various destinations that communications from the PG 230 that the EPG 210 belongs to are permitted to be sent to (e.g., a whitelist), various destination that communication from the PG 230 that the EPG 210 belongs to are not permitted to be sent to (e.g., a blacklist), as well as various restrictions or requirements for how to handle the communication (e.g., encryption, size restrictions, transmission protocols). In some embodiments, the security policies are a flattened security policy that are applied to all members of a PG 230 for all destinations in a given DG 240 rather than individual EPG-to-EPG security policies.

When the offload switch determines that the security policy does not permit communications from the EPG 210 to the indicated destination, method 500 proceeds to block 505, where the offload switch blocks the outbound communication from being sent to the indicated destination. In some embodiments, the outbound communication is dropped from the offload switch, sent to a quarantine device in the network, or transmitted to a network controller to seek permission to override or update the security policy to allow the communication to be sent. In various embodiments, the offload switch sends a message to the EPG 210 indicating that the communication has been blocked from transmission. Method 500 may then conclude.

When the offload switch determines that the security policy permits communications from the EPG 210 to the indicated destination, method 500 proceeds to block 555, where the offload switch forwards the communication to the indicated destination. Method 500 may then conclude.

FIG. 5B is a flowchart of method 590, which begins at block 560 in response to receiving an inbound message at the offload switch, such as, for example, a responsive message to the outbound communication transmitted at block 555 of method 500, discussed in relation to FIG. 5A.

At block 565, the offload switch identifies the network tunnel 320 associated with the connected switch that the offloaded EPG 210 indicated in the inbound message received at block 560 is connected to. In various embodiments, the offload switch identifies the offloaded EPG 210 from header address information in the message (e.g., a destination IP address field in the message), and identifies the network tunnel 320 based on an association between the EPG IP address and the IP address (as modified) of the connected switch. In some embodiments, the relationship between the EPG IP address and the network tunnel 320 linking the offload switch to the connected switch is conversationally learned (e.g., as part of block 535 in FIG. 5A) when handling outbound communications from the EPG 210.

At block 570, the offload switch encapsulates the inbound message (e.g., in a VPN packet) and forwards the encapsulated message via the network tunnel 320 to the connected switch associated with the destination EPG 210 indicated in the message. In various embodiments, the encapsulated message includes the IP address of the connected switch, as modified by the port offset, as a destination IP address for the encapsulated message.

At block 575, the connected switch receives the encapsulated message via the network tunnel 320, and at block 580, the connected switch decapsulates the message (e.g., by removing VPN header fields) and identifies the port offset. Because the connected switch knows its own IP address (i.e., the source IP address in the outbound communications) and the predefined rule used to modify the IP address of the connected switch in the encapsulated outbound communications (and used in the encapsulated inbound messages), the connected switch applies the predefined rule in reverse to identify the port offset for the inbound message. For example, when the predefined rule adds the port offset (e.g., P=1 for port 1) to the fourth byte of a source IP address (e.g., S=10.0.0.1) for an outbound communication (e.g., producing S+P=10.0.0.2), the connected switch can subtract the value of the fourth byte of its IP address from the received destination IP address of the encapsulated inbound message to yield the value of the port offset (e.g., S+P−S=1 for port 1).

At block 585, the connected switch forwards the decapsulated message to the destination EPG 210 on the identified port. Method 590 may then conclude.

Figure 6:
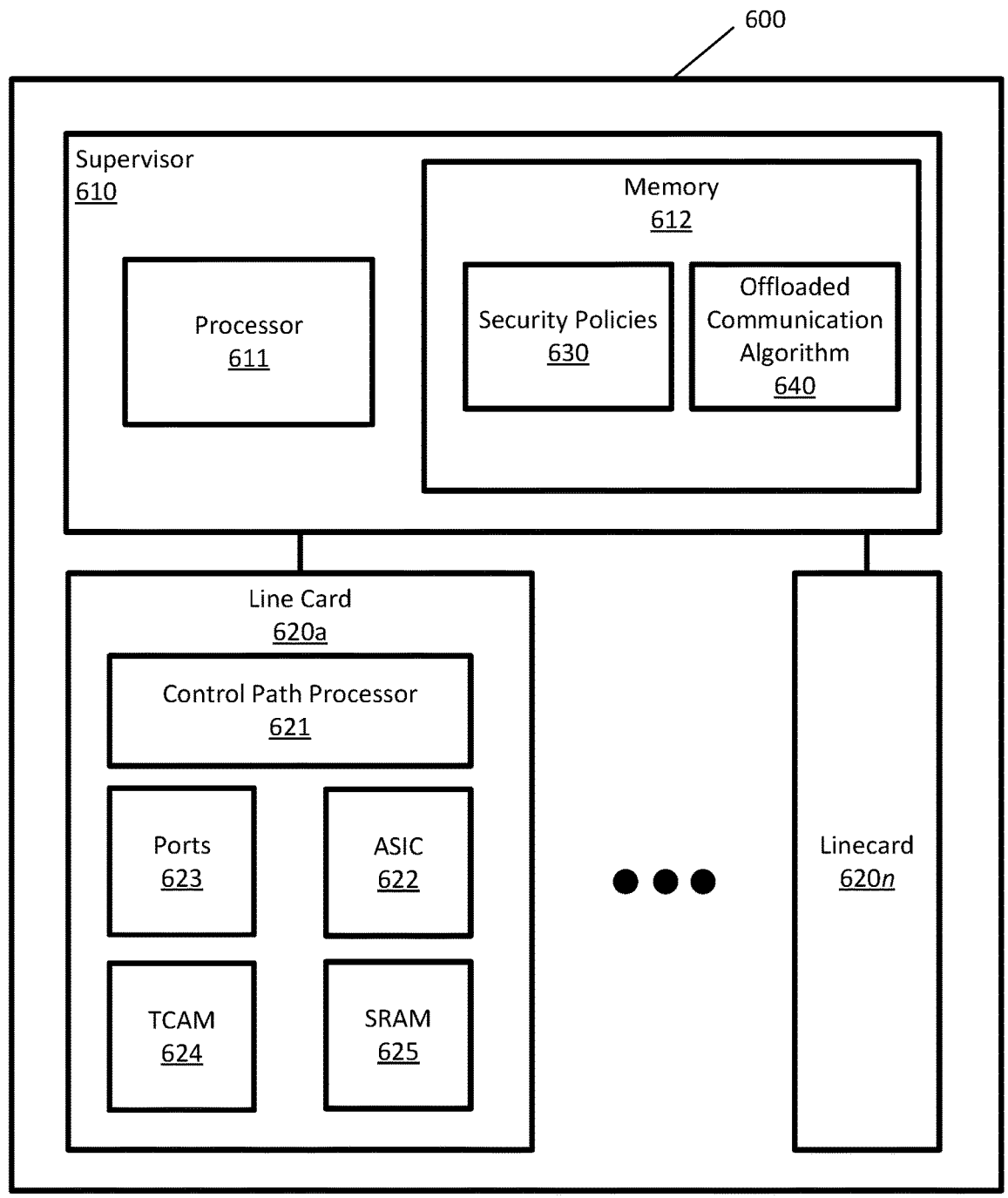
FIG. 6 illustrates hardware of a network switch, according to embodiments of the present disclosure.

FIG. 6 illustrates hardware of a network switch 600, as may be used as one of a spine switch 120 or a leaf switch 130 according to embodiments of the present disclosure. The network switch 600 includes a supervisor module 610 and a plurality of linecards 620*a-n*. The supervisor module 610 includes a processor 611 and memory 612. The memory 612 stores software instructions that are executed by the processor 611. In particular, the memory 612 may store various security policies 630 (including individual EPG security policies and PG policies 250), class IDs, instructions for routing data to other devices (e.g., external devices or other network switches 600 in a network fabric), and an optimized offloaded communications algorithm 640 to perform one or more of the methods described in the present disclosure.

Each linecard 620 includes a control path processor 621, an Application Specific Integrated Circuit (ASIC) 622, a plurality of ports/interfaces 623 coupled to the ASIC 622, a Ternary Content-Addressable Memory (TCAM) 624, and a Static Random Access Memory (SRAM) 625. The control path processor 621 is a CPU/processor that receives configuration commands from the supervisor module 610 to program the TCAM 624 and SRAM 625. The ASIC 622 is a hardware device that directs an incoming packet at a port/interface 623 to a particular other port/interface on another device (e.g., another network switch 600, a host device 140, a router, a firewall, etc.) based on the content of the TCAM 624 and SRAM 625. The ASIC 622 may buffer received packets in the TCAM/SRAM for delayed transmission to the other device. There may be multiple TCAM/SRAM pairs in a linecard 620.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:
    establishing a network tunnel between a first switch and a second switch in a network fabric, wherein the second switch enforces security policies for a policy group including a first Endpoint Group (EPG) that are physically connected to the first switch;
    in response to receiving a communication from the first EPG at the first switch intended for a destination, the communication including a source IP address of the first switch and a Virtual Private Network (VPN) Routing and Forwarding identifier (VRF ID) of the first EPG:
        modifying the source IP address with a port offset associated with a port of the first switch to which the first EPG is connected,
        modifying the VRF ID with a group offset associated with an identity of the policy group, and
        transmitting the communication via the network tunnel from the first switch to the second switch; and
    in response to receiving the communication over the network tunnel at the second switch from the first switch:
        identifying the security policies for the policy group based on the group offset, and
        in response to determining that the communication is permitted by the security policies, transmitting the communication to the destination.

2. The method of claim 1, wherein the second switch conversationally learns from the communication that an EPG IP address of the first EPG is associated with the source IP address as modified by the port offset.

3. The method of claim 2, further comprising, in response to receiving a message at the second switch for the first EPG, the message including the EPG IP address as a destination IP address:
    encapsulating the message for transmission via the network tunnel based on the destination IP address being associated with the source IP address as modified by the port offset;
    forwarding the message on the network tunnel from the second switch to the first switch using with the source IP address as modified by the port offset; and
    in response to determining, at the first switch, that the message is destined for the port based on a predefined rule between the source IP address and the port offset, forwarding the communication to the first EPG via the port.

4. The method of claim 1, further comprising:
    in response to receiving a second communication from the first EPG at the first switch intended for a second destination, the communication including the source IP address and the VRF ID:
        modifying the source IP address with the port offset;
        modifying the VRF ID with the group offset; and
        transmitting the second communication via the network tunnel from the first switch to the second switch; and
    in response to receiving the second communication over the network tunnel at the second switch from the first switch:
        identifying the security policies for the policy group based on the group offset; and
        in response to determining that the second communication is not permitted by the security policies, blocking transmission of the communication to the destination.

5. The method of claim 1, further comprising flattening, on the second switch, the security policies for EPGs included in the policy group into one security policy for allowing communication with one destination group of EPGs.

6. A non-transitory computer readable storage device including instructions that when performed by a processor, enable the processor to perform an operation comprising:
    establishing a network tunnel between a first switch and a second switch in a network fabric, wherein security policies for a policy group including a first Endpoint Group (EPG) physically connected to the first switch are offloaded to the second switch to implement;
    setting a port offset, based on a port of the first switch to which the first EPG is connected;
    setting a group offset based on an identity of the policy group;
    in response to receiving a communication from the first EPG at the first switch intended for a destination, the communication including a source IP address of the first switch and a Virtual Private Network (VPN) Routing and Forwarding identifier (VRF ID) that the first EPG belongs to:
        modifying the source IP address with the port offset;
        modifying the VRF ID with the group offset; and
        transmitting the communication via the network tunnel from the first switch to the second switch; and
    in response to receiving the communication over the network tunnel at the second switch from the first switch:
        identifying the security policies for the policy group based on the group offset; and
        in response to determining that the communication is permitted by the security policies, transmitting the communication to the destination.

7. The non-transitory computer readable storage device of claim 6, wherein the instructions, when performed, further enable the processor to perform the operation comprising:
    in response to receiving a message at the first switch for the first EPG of the policy group, the message including a destination IP address and a destination VRF ID:
    in response to determining, at the second switch, that the message is intended for the first policy group based on the destination VRF ID and the group offset, forwarding the message on the network tunnel from the second switch to the first switch based on the destination IP address indicated by the message; and
    in response to determining, at the first switch, that the message is destined for the port based on a predefined rule between the destination IP address and the port offset, forwarding the communication to the first EPG via the port.

8. The non-transitory computer readable storage device of claim 7, wherein the source IP address is modified with the port offset according to the predefined rule, the predefined rule comprising:
    a designated portion of the source IP address; and
    a reversible mathematical operation to apply the port offset to the designated portion.

9. The non-transitory computer readable storage device of claim 8, wherein the instructions, when performed, further enable the processor to perform the operation comprising:
    flattening, on the second switch, the security policies for EPGs included in the policy group into one security policy for allowing communication with one destination group of EPGs.

10. The non-transitory computer readable storage device of claim 6, wherein the instructions are performed in response to receiving a command to optimize a network including the first switch and the second switch, selected from one of adding a new switch to the plurality of switches, removing an existing switch from the plurality of switches, and reconfiguring a given switch of the plurality of switches; and assigning the security policies for the policy group from the first switch to the second switch.

11. A method, comprising:
grouping a first plurality of End Point Groups (EPGs) into a first plurality of policy groups based on shared security policies, wherein the first plurality of EPGs is connected to a plurality of switches in a network;
identifying a first policy group with a highest resource demand of the first plurality of policy groups;
assigning a first security policy corresponding to the first policy group to a first switch of the plurality of switches;
identifying a second plurality of EPGs from the remaining EPGs of the first plurality of EPGs that were not included in the first policy group;
grouping the second plurality of EPGs into a second plurality of policy groups based on shared security policies;
identifying a second policy group with a highest resource demand of the second plurality of policy groups; and
assigning a second security policy corresponding to the second policy group to a second switch of the plurality of switches.

12. The method of claim 11, wherein at least one EPG of the first plurality of EPGs belongs to multiple policy groups of the first plurality of policy groups.

13. The method of claim 11, wherein resources available at each switch of the plurality of switches include:
Content Addressable Memory space;
Local Area Network table space;
endpoint table space; and
route table space.

14. The method of claim 11, further comprising, after assigning the first security policy, determining remaining resources available at each switch of the plurality of switches by:
determining, for each switch of the plurality of switches, usage rates for each resource of a plurality of resources comprising the remaining resources available;
determining a composite metric of rank exponent weights for each switch of the plurality of switches, based on the usage rates of each resource of the remaining resources available; and
wherein the second switch is associated with a highest composite metric value in the plurality of switches.

15. The method of claim 14, wherein composite metric values for each switch of the plurality of switches is based on a z-score for a given resource relative to the plurality of resources available on a given switch.

16. The method of claim 11, further comprising:
flattening, on the first switch, the shared security policies for the EPGs included in the first policy group into the first security policy for permitting communication with a destination group.

17. The method of claim 16, wherein the first policy group is physically connected to the second switch and the first security policy is offloaded from the second switch to the first switch.

18. The method of claim 17, further comprising:
establishing a network tunnel between the first switch and the second switch;

setting a port offset for an IP (Internet Protocol) address of the second switch for the first policy group, based on a port of the second switch to which the EPGs of the first policy group are connected;
setting a group offset for a Virtual Private Network (VPN) Routing and Forwarding identifier (VRF ID) for the first policy group based on an identity of the first policy group;
in response to receiving a communication from a first EPG at the second switch intended for a destination, the communication including a source IP address of the second switch and a Virtual Private Network (VPN) Routing and Forwarding identifier (VRF ID) that the EPGs of the first policy group belong to:
modifying the source IP address with the port offset;
modifying the VRF ID with the group offset; and
transmitting the communication via the network tunnel from the second switch to the first switch; and
in response to receiving the communication over the network tunnel at the first switch from the second switch:
identifying the first security policy based on the group offset; and
in response to determining that the communication is permitted by the first security policy, transmitting the communication to the destination.

19. The method of claim 18, wherein the first switch conversationally learns from the communication that an EPG IP address of the first EPG is associated with the source IP address as modified by the port offset, further comprising:
in response to receiving a message at the first switch for a given EPG of the first policy group, the message including a destination IP address for the first EPG:
encapsulating the message for transmission via the network tunnel based on the destination IP address being associated with the source IP address as modified by the port offset;
forwarding the message on the network tunnel from the first switch to the second switch using the source IP address as modified by the port offset; and
in response to determining, at the second switch, that the message is destined for the port based on a predefined rule between the source IP address and the port offset, forwarding the communication to the first EPG via the port.

20. The method of claim 18, further comprising:
in response to receiving a second communication from the EPG at the second switch intended for a second destination, the second communication including the source IP address and the VRF ID:
modifying the source IP address with the port offset;
modifying the VRF ID with the group offset; and
transmitting the second communication via the network tunnel from the second switch to the first switch; and
in response to receiving the second communication over the network tunnel at the first switch from the second switch:
identifying the first security policy based on the group offset; and
in response to determining that the second communication is not permitted by the first security policy, blocking transmission of the second communication to the second destination.

* * * * *

UNITED STATES PATENT AND TRADEMARK OFFICE
CERTIFICATE OF CORRECTION

PATENT NO. : 11,171,992 B2  
APPLICATION NO. : 16/525362  
DATED : November 9, 2021  
INVENTOR(S) : Azeem M. Suleman et al.

Page 1 of 1

It is certified that error appears in the above-identified patent and that said Letters Patent is hereby corrected as shown below:

On the Title Page

Item (74), in Column 2, in "Attorney, Agent or Firm", Line 1, delete "Shendan," and insert -- Sheridan, --, therefor.

In the Specification

In Column 9, Line 25, delete "p" and insert -- µ --, therefor.

In Column 9, Line 27, delete "a" and insert -- σ --, therefor.

Signed and Sealed this  
Eighth Day of February, 2022

Drew Hirshfeld  
*Performing the Functions and Duties of the*  
*Under Secretary of Commerce for Intellectual Property and*  
*Director of the United States Patent and Trademark Office*